United States Patent Office 3,211,756
Patented Oct. 12, 1965

3,211,756
3 - HYDROXYIMINO-17α-(LOWER ALKYL)-5α-ANDROSTAN-17β-OLS AND THE OPTIONALLY SUBSTITUTED 3-ACYLOXYIMINO AND 3-ALKOXYIMINO DERIVATIVES CORRESPONDING
Robert H. Mazur, Deerfield, Ill., assignor to G. D. Searle & Co., Chicago, Ill., a corporation of Delaware
No Drawing. Filed July 23, 1963, Ser. No. 296,940
20 Claims. (Cl. 260—397.1)

The present invention is concerned with novel steroids characterized by a hydroxyimino, acyloxyimino, or alkoxyimino substituent at the 3-position and, more particularly, with the 3-hydroxyimino-, 3-(optionally substituted acyloxy)imino-, and 3-(optionally substituted alkoxy)-imino-17α-(lower alkyl)-5α-androstan-17β-ols, which can be represented by the structural formula

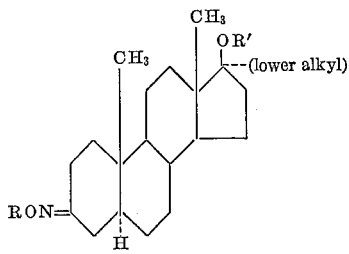

wherein R can be hydrogen or a radical selected from the group consisting of benzhydryl, diphenylacetyl, and those radicals of the formulas -(lower alkylene)-X and

wherein X and Y can be hydrogen or a di-(lower alkyl)-amino, carboxy, phenyl, halophenyl, di-(lower alkyl) aminophenyl, lower alkyl, (lower alkoxy)phenyl, or benzyl radical, and R' represents hydrogen or a lower alkanoyl radical.

By the term lower alkyl is meant those radicals typified by methyl, ethyl, propyl, butyl, pentyl, hexyl, and the branched-chain groups isomeric therewith. Examples of the lower alkoxy groups encompassed in the foregoing structural representation are methoxy, ethoxy, propoxy, butoxy, pentyloxy, hexyloxy, and the corresponding branched-chain isomers.

The compounds of the present invention can be manufactured conveniently by utilizing 17α-(lower alkyl)-17β-hydroxy-5α-androstan-3-ones or the corresponding 17-(lower alkanoates) as starting materials. The latter substances can be condensed with hydroxylamine or an appropriately O-substituted hydroxylamine, preferably as the hydrohalide salt, in the presence of a suitable alkaline catalyst such as pyridine to afford the corresponding hydroxyamino or O-substituted hydroxyimino derivatives. The reaction of 17β-hydroxy-17α-methyl-5α-androstan-3-one, for example, with hydroxylamine hydrochloride, methoxyamine hydrochloride, or 2-diethylaminoethoxyamine dihydrobromide, in pyridine solution, affords 3-hydroxy-imino-17α-methyl-5α-androstan-17β-ol, 3-methoxyimino-17α-methyl-5α-androstan-17β-ol, and 3-(2-diethylaminoethoxy)imino-17α-methyl - 5α - androstan-17β-ol, respectively.

The (substituted-oxy)imino compounds of the present invention can be prepared alternatively by reaction of the aforementioned hydroxyimino derivatives with the appropriate alkylating or acylating agent. A suitable acylation process is illustrated by the reaction of 3-hydroxyimino-17α-methyl-5α-androstan-17β-ol with p-chlorobenzoic anhydride in pyridine to afford 3-(p-chlorobenzoyloxy)-imino-17α-methyl-5α-androstan-17β-ol. Other acylating agents such as the acyl halides and particularly the acyl chlorides may be used similarly. Alkylation of the 3-hydroxyimino group is preferably effected by reaction with the appropriate optionally substituted alkyl halide in the presence of a strongly alkaline catalyst such as sodamide in an inert organic solvent such as benzene. In this manner, the aforementioned 3-hydroxyimino-17α-methyl-5α-androstan-17β-ol, for example, is contacted with 2-dimethylaminoethyl chloride and sodamide in benzene to afford 3-(2-dimethylaminoethoxy)imino - 17α - methyl-5α-androstan-17β-ol.

The compounds of this invention exhibit valuable pharmacological properties. They are hormonal agents, for example, as is evidenced by their anabolic, androgenic, and estrogenic activity. They are also hypochloesterolemic agents in view of their ability to reduce blood plasma choesterol concentration. In addition, they possess antibiotic activity, as is demonstrated by their ability to inhibit the growth of such organisms as *Diplococcus pneumoniae* and *Chlorella vulgaris*, and also their ability to inhibit dicotyledeous seed germination.

The invention will appear more fully from the examples which follow. These examples are set forth by way of illustration only, and it will be understood that the invention is not to be construed as limited in spirit or in scope by the details contained therein as many modifications in materials and methods will be apparent from this disclosure to those skilled in the art. In these examples temperatures are given in degrees centigrade (° C.). Quantities of materials are expressed in parts by weight unless otherwise noted.

Example 1

To a solution of 3.04 parts of 17β-hydroxy-17α-methyl-5α-androstan-3-one in 30 parts of pyridine is added 10 parts of acetic anhydride, and the resulting reaction mixture is heated at the reflux temperature for about 24 hours. The solution is concentrated to dryness at reduced pressure, and resulting residue is crystallized from aqueous ethanol to afford 17β-hydroxy-17α-methyl-5α-androstan-3-one 17-acetate, melting at about 156–156.5°.

Example 2

The reaction of 3.18 parts of 17α-ethyl-17β-hydroxy-5α-androstan-3-one with 12.7 parts of propionic anhydride and 30 parts of pyridine according to the procedure of Example 1 results in 17α-ethyl-17β-hydoxy-5α-androstan-3-one 17-propionate.

Example 3

A mixture of 30.4 parts of 17β-hydroxy-17α-methyl-5α-androstan-3-one, 10.4 parts of hydroxylamine hydrochloride, and 400 parts of pyridine is heated for one hour at steam bath temperature, then is poured slowly into approximately 2000 parts of water. The resulting precipitated product is collected by filtration, washed on the filter with water, and dried to afford 3-hydroxy-imino-17α-methyl-5α-androstan-17β-ol, melting at about 248–250°. Crystallization from aqueous ethanol affords a pure sample, melting at about 250–251°. This compound is represented by the structural formula

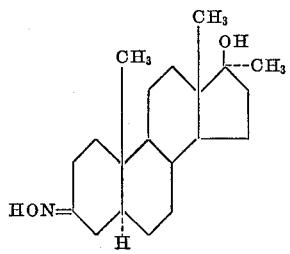

Example 4

A mixture of 3.46 parts of 17β-hydroxy-17α-methyl-5α-androstan-3-one 17-actetate, 1.39 parts of hydroxylamine hydrochloride, and 35 parts of pyridine is heated on a steam bath for about one hour, then is diluted with water. The solid which separates is collected by filtration, washed on the filter with water, and dried to yield 3-hydroxyimino-17α-methyl-5α-androstan-17β-ol 17-acetate, melting at about 236–238°, and represented by the structural formula

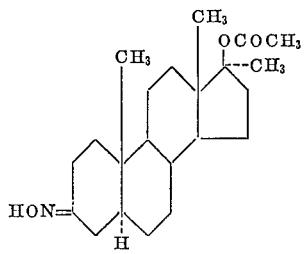

Example 5

The substitution of 3.74 parts of 17α-ethyl-17β-hydroxy-5α-androstan-3-one 17-propionate in the procedure of Example 4 results in 17α-ethyl-3-hydroxyimino-5α-androstan-17β-ol 17-propionate. It is represented by the strucural formula

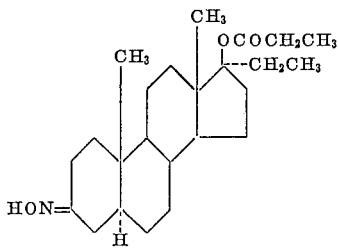

Example 6

A mixture of 6.36 parts of 17α-ethyl-17β-hydroxy-5α-androstan-3-one, 2.78 parts of hydroxylamine hydrochloride, and 65 parts of pyridine is allowed to react according to the procedure described in Example 3, resulting in 17α-ethyl-3-hydroxyimino-5α-androstan-17β-ol, melting at about 220–226°. It is recrystallized from ethanol to afford the pure material, melting at about 228–230°. This substance is represented by the structural formula

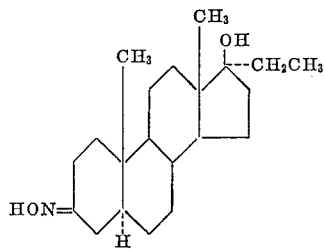

Example 7

To a solution of 2.51 parts of 3-hydroxyimino-17α-methyl-5α-androstan-17β-ol in 25 parts of pyridine is added 10 parts of acetic anhydride, and the resulting solution is allowed to stand at room temperature for about 3 hours. This reaction mixture is then cooled to 0–5°, and approximately 10 parts of water is added. After standing for approximately 30 minutes, the mixture is extracted with ethyl acetate, and the organic layer is separated, washed successively with aqueous sodium sulfate, dilute hydrochloric acid, aqueous sodium sulfate, and dilute potassium bicarbonate, then is dried over anhydrous sodium sulfate and stripped of solvent at reduced pressure to afford 3-acetoxyimino-17α-methyl-5α-androstan-17β-ol, melting at about 165–175°. Recrystallization from aqueous methanol produces the pure material, melting at about 170–175°. This substance is represented by the structural formula

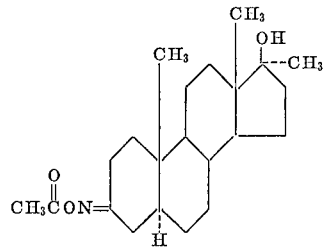

Example 8

The reaction of 2.62 parts of 17α-ethyl-3-hydroxyimino-5α-androstan-17β-ol and 12.7 parts of propionic anhydride by the procedure described in Example 7 results in 17α-ethyl-3-propionoxyimino-5α-androstan-17β-ol of the structural formula

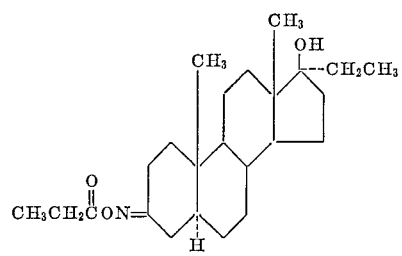

Example 9

The reaction of 3.04 parts of 17β-hydroxy-17α-methyl-5α-androstan-3-one with 1.25 parts of methoxyamine hydrochloride by the procedure described in Example 3 affords 3-methoxylimino-17α-methyl-5α-androstan-17β-ol, melting at about 167–170°. Recrystallization from aqueous ethanol affords a pure sample, melting at about 173–174°. This substance is represented by the structural formula

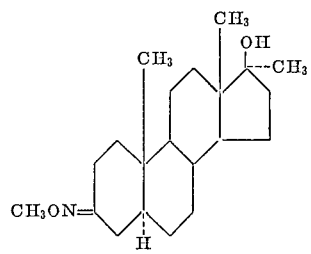

Example 10

By reacting 3.04 parts of 17β-hydroxy-17α-methyl-5α-androstan-3-one with 1.75 parts of tertiary-butoxyamine hydrochloride according to the procedure described in Example 3, 3-(tertiary-butoxy)imino-17α-methyl-5α-androstan-17β-ol, melting at about 138–143°, is obtained. Recrystallization from aqueous ethanol affords the pure material, melting at about 141–143°. This substance can be represented by the structural formula

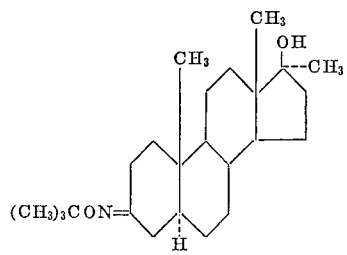

Example 11

A mixture of 3.04 parts of 17β-hydroxy-17α-methyl-5α-androstan-3-one, 7.35 parts of 2-diethylaminoethoxyamine dihydrobromide, and 50 parts of pyridine is allowed to react by the procedure described in Example 3. The reaction mixture is slowly poured into water, and the resulting aqueous solution is made strongly basic by the addition of dilute sodium hydroxide. The resulting solid is collected by filtration, washed on the filter with water, and dried to afford 3-(2-diethylaminoethoxy)-imino-17α-methyl - 5α - androstan - 17β - ol, melting at about 102–105°. Recrystallization from cyclohexane affords the pure material, melting at about 100–104°. This substance is further characterized by the structural formula

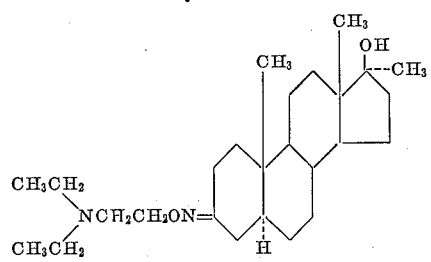

*Example 12*

To a solution of 4.18 parts of 3-(2-diethylaminoethoxy)-imino-17α-methyl-5β-androstan-17β-ol in 35 parts of ether is added a solution of 2.32 parts of maleic acid in 17.5 parts of ether containing 2.4 parts of methanol. The resulting product is collected by filtration and dried to afford 3 - (2 - diethylaminoethoxy) - imino - 17α - methyl - 5α - androstan-17β-ol maleate, melting at about 134–139°. Recrystallization from ether-isopropyl alcohol results in the pure material, melting at about 141–144°. It is represented by the structural formula

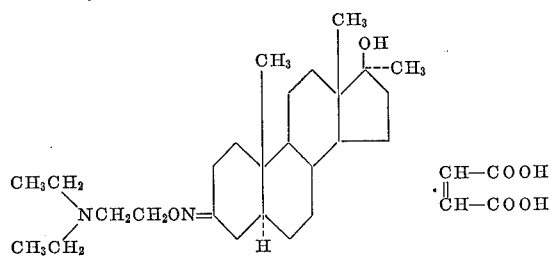

*Example 13*

A mixture of 16.8 parts of potassium hydroxide and 120 parts of anhydrous ethanol is heated to achieve solution. To that solution is added successively, at 0–5°, 31.5 parts of hydroxyurethane and 36.6 parts of 3-dimethylaminopropyl chloride. This reaction mixture is stirred and heated at the reflux temperature for about 4 hours, then is filtered, and the filtrate is concentrated to dryness under reduced pressure to afford 3-dimethylaminopropoxyurethane.

A solution of 9.5 parts of 3-dimethylaminopropoxyurethane in 37 parts of 48% hydrobromic acid is heated at the reflux temperature, resulting in a vigorous evolution of carbon dioxide. Heating is continued for about one hour, at the end of which time the solution is cooled and concentrated to dryness under reduced pressure. Water is added to the resulting residue, then is removed by distillation at reduced pressure. This process is repeated in order to remove any excess hydrobromic acid present. The remaining residue is dried to afford 3-dimethylaminopropoxyamine dihydrobromide, isolated as a sirup.

The reaction of 3.04 parts of 17β-hydroxy-17α-methyl-5-α-androstan-3-one with 7 parts of 3-dimethylaminopropoxyamine dihydrobromide according to the procedure described in Example 11 results in 3-(3-dimethylaminopropoxy)imino-17α-methyl-5α-androstan-17β-ol, which is characterized by infrared absorption peaks at about 2.77 and 6.10 microns.

*Example 14*

By reacting 3.04 parts of 17β-hydroxy-17α-methyl-5α-androstan-3-one with 1.65 parts of carboxymethoxyamine hemihydrochloride according to the procedure described in Example 3, 3-carboxymethoxyimino-17α-methyl-5α-androstan-17β-ol, melting at about 190–192°, is obtained. Purification by recrystallization from aqueous ethanol affords material melting at about 198–199°. This substance is characterized further by the structural formula

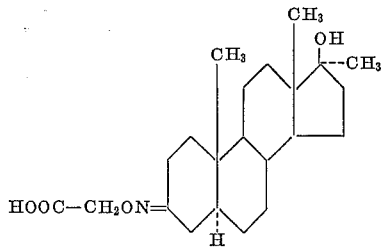

*Example 15*

The reaction of 3.18 parts of 17α-ethyl-17β-hydroxy-5α-androstan-3-one with 1.86 parts of 1-carboxyethoxyamine hemihydrochloride according to the procedure described in Example 3 affords 3-(1-carboxyethoxy)imino-17α-ethyl-5α-androstan-17β-ol of the structural formula

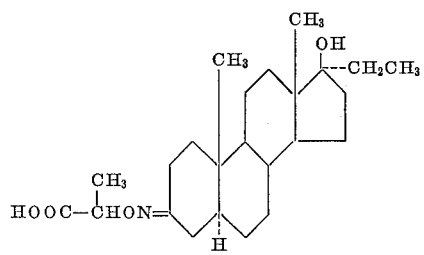

*Example 16*

By the reaction of 3.04 parts of 17β-hydroxy-17α-methyl-5α-androstan-3-one with 2.52 parts of p-chlorobenzyloxyamine hydrochloride according to the processes described in Example 3, 3-(p-chlorobenzyloxy)amino-17α-methyl-5α-androstan-17β-ol, melting at about 124–128°, is obtained. It is recrystallized from aqueous ethanol to afford the pure material, melting at about 130–132°. This substance is characterized further by the structural formula

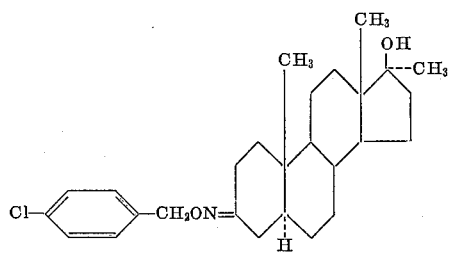

*Example 17*

The reaction of 3.18 parts of 17α-ethyl-17β-hydroxy-5α-androstan-3-one with 3.28 parts of m-bromo-phenethoxyamine hydrochloride by the procedure of Example 3 results in 3-(m-bromophenethoxy)imino-17α-ethyl-5α-androstan-17β-ol, characterized by the structural formula

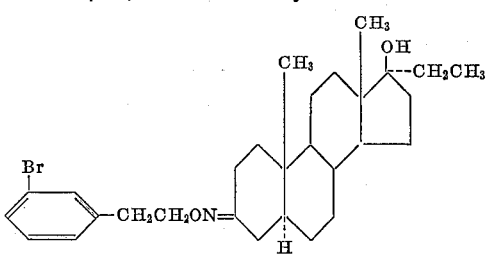

Example 18

The reaction of 3.04 parts of 17β-hydroxy-17α-methyl-5α-androstan-3-one with 2.07 part of benzyloxyamine hydrochloride according to the processes of Example 3 affords 3-benzyloxyimino-17α-methyl-5α-androstan-17β-ol, characterized by the structural formula

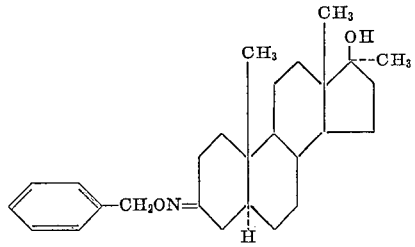

Example 19

To a solution of 60.8 parts of benzhydrol in 500 parts of dioxane is added 14.4 parts part of a 55% dispersion of sodium hydride in mineral oil. The resulting mixture is heated at the reflux temperature for about 15 minutes, resulting in a clear blue solution which becomes pale yellow upon cooling.

To 1000 parts by volume of 0.75 M sodium hypochlorite is added sodium chloride to the saturation point followed by 700 parts of ether. This mixture is cooled to about −5°, and 63 parts of concentrated ammonium hydroxide is added with vigorous stirring, keeping the temperature below 3°. The ether layer is then separated, and the aqueous layer is extracted with approximately 700 parts of ether. The combined ether extracts are dried over anhydrous calcium chloride at about 0°. Titration of this ether solution indicates the presence of 12.3 parts of chloramine.

To the solution of benzhydrol sodium, at 80° with stirring, is added the chloramine solution at such a rate that the temperature remains at 70–75°, at the same time allowing ether to distill from the mixture. Filtration to remove sodium chloride affords a solution which is cooled to 0–5°, then saturated with dry hydrogen chloride. The resulting precipitate is collected by filtration, washed on the filter with ether, and dried to yield benzhydryloxyamine hydrochloride, melting at about 179–180°. Recrystallization from ethanol-ether affords a sample melting at 181–182°.

The reaction of 3.04 parts of 17β-hydroxy-17α-methyl-5α-androstan-3-one with 3.54 parts of benzhydryloxyamine hydrochloride according to the procedure described in Example 3 results in 3-benzhydryloxyimino-17α-methyl-5α-androstan-17β-ol, melting at about 140–155°. This substance is purified by recrystallization from aqueous ethanol to afford material melting at about 150–158°. It is represented by the structural formula

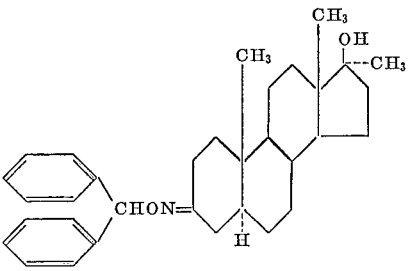

Example 20

A mixture of 3.19 parts of 3-hydroxyimino-17α-methyl-5α-androstan-17β-ol, 5.72 parts of p-methoxybenzoic anhydride, and 60 parts of pyridine is heated at steam bath temperature for about 2 hours, after which time 10 parts of water is added and heating is continued for about one hour. This reaction mixture is then poured into approximately 2000 parts of water, and the resulting precipitated product is collected by filtration, washed on the filter with water, and dried to afford 3-(p-methoxybenzoyloxy)imino-17α-methyl-5α-androstan-17β-ol, melting at about 160–182°. Further purification is effected by crystallization from aqueous ethanol, resulting in material melting at about 175–185°. This compound is characterized further by the structural formula

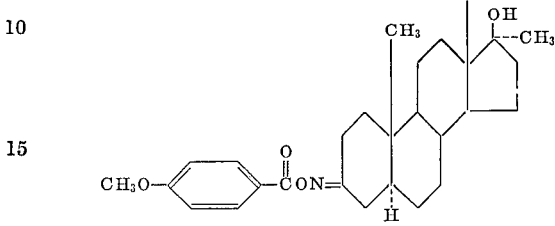

Example 21

The substitution of 6.28 parts of m-ethoxybenzoic anhydride in the procedure of Example 20 results in 3-(m-ethoxybenzoyloxy)imino-17α - methyl-5α-androstan-17β-ol, characterized by the structural formula

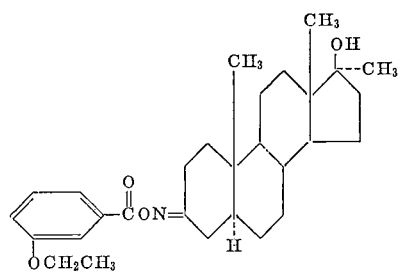

Example 22

To a suspension of 16.5 parts of m-dimethylaminobenzoic acid in 35 parts of pyridine is added 9.6 parts of p-toluenesulfonyl chloride, and the mixture is stirred for several minutes in order to achieve homogeneity. The resulting solution is heated on the steam bath for about one hour, then is cooled in an ice bath and poured into a mixture of ice and water. The product which separates is collected by filtration, washed on the filter with cold water, dried, then crystallized from ethyl acetate-cyclohexane to afford m-dimethylaminobenzoic anhydride, melting at about 117–119°.

The substitution of 6.24 parts of m-dimethylaminobenzoic anhydride in the procedure of Example 20 results in 3-(m-dimethylaminobenzoyloxy)imino - 17α - methyl-5α-androstan-17β-ol, melting at about 165–177°. Recrystallization from aqueous ethanol results in the pure material melting at about 177–181°. It is characterized further by the structural formula

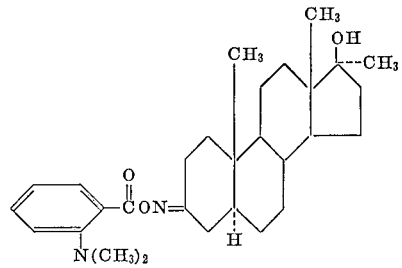

Example 23

By substituting 7.36 parts of p-diethylaminobenzoic anhydride, prepared from p-diethylaminobenzoic acid by the procedure described in Example 22, in the procedure described in Example 20, 3-(p-diethylaminobenzoyloxy)

imino-17α-methyl-5α-androstan-17β-ol is obtained. This substance is represented by the structural formula

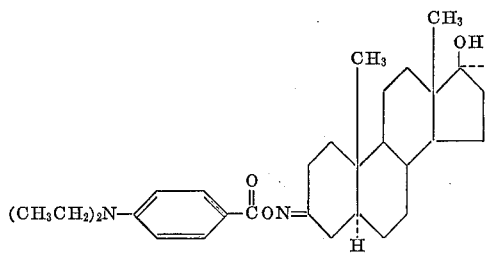

*Example 24*

The substitution of 4.52 parts of benzoic anhydride in the procedure described in Example 20 results in 3-benzoyloxyimino-17α-methyl-5α-androstan-17β-ol, characterized by the structural formula

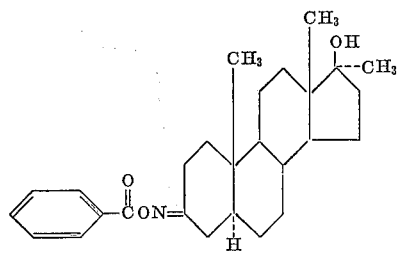

*Example 25*

The reaction of 0.96 part of 3 - hydroxyimino - 17α-methyl - 5α - androstan - 17β - ol and 1.77 parts of p-chlorobenzoic anhydride according to the procedure described in Example 20 results in 3-(p-chlorobenzoyloxy)-imino - 17α - methyl - 5α - androstan - 17β - ol, melting at about 175–179°. Recrystallization of the latter material from aqueous ethanol results in a pure sample, melting at about 182–184°. It is represented by the structural formula

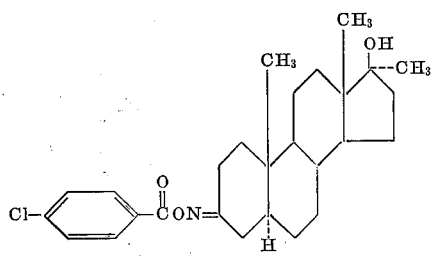

*Example 26*

The reaction of 0.96 part of 3 - hydroxyimino - 17α-methyl - 5α - androstan - 17β - ol with 2.3 parts of m-bromobenzoic anhydride according to the processes described in Example 20 results in 3-(m-bromobenzoyloxy) - imino - 17α - methyl - 5α - androstan - 17β - ol of the structural formula

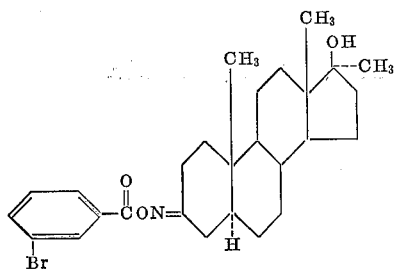

*Example 27*

The substitution of 5.08 parts of phenylacetic anhydride in the procedure of Example 20 results in 17α-methyl - 3 - phenylacetylimino - 5α - androstan - 17β - ol, represented by the structural formula

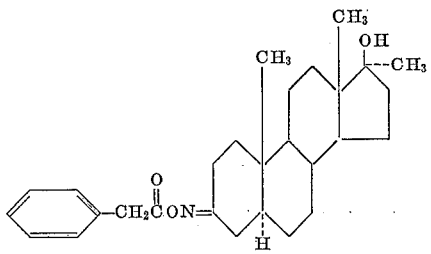

*Example 28*

The substitution of 1.5 parts of succinic anhydride in the procedure described in Example 20 results in 3-(3-carboxypropionyloxy)imino - 17α - methyl - 5α - androstan-17β-ol, characterized by the structural formula

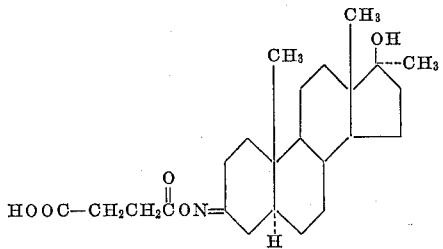

*Example 29*

A mixture of 0.96 part of 3 - hydroxyimino - 17α-methyl - 5α - androstan 17β - ol, 2.44 parts of diphenylacetic anhydride, and 20 parts of pyridine is kept at room temperature for about 3 hours, at the end of which time it is cooled in an ice bath and diluted with 5 parts of water. The resulting mixture is allowed to stand for about one hour, at the end of which time 200 parts by volume of a 1:1 mixture of ether and ethyl acetate and 100 parts of water are added successively. The organic layer is separated, washed successively with 10% aqueous sodium sulfate, dilute hydrochloric acid, 10% aqueous sodium sulfate, and dilute aqueous potassium bicarbonate, then is dried over anhydrous sodium sulfate and evaporated to dryness under reduced pressure to afford 3-diphenylacetoxyimino - 17α - methyl - 5α - androstan-17β - ol, melting at about 179–181°. This substance is further characterized by infrared absorption maxima at about 2.76, 5.78, and 6.10 microns and also by the structural formula

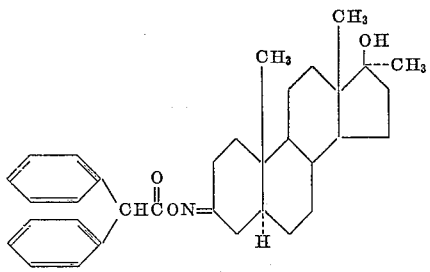

What is claimed is:
1. A compound of the formula

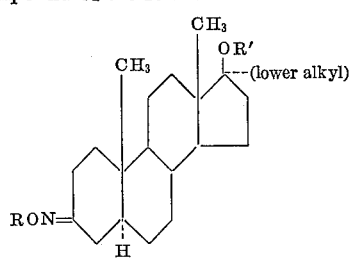

wherein R is a member of the class consisting of hydrogen and radicals selected from the group consisting of benzhydryl, diphenylacetyl, and radicals of the formulas —(lower alkylene)—X and

wherein X and Y are selected from the group consisting of hydrogen, di-(lower alkyl)amino, carboxy, phenyl, chlorophenyl, bromophenyl, di-(lower alkyl)aminophenyl, (lower alkoxy)phenyl, lower alkyl, and benzyl, and R' is a member of the class consisting of hydrogen and radicals of the formula

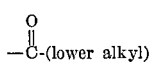

2. 3 - (p - chlorobenzyloxy)imino - 17α - methyl - 5α-androstan-17β-ol.
3. 3-benzhydryloxyimino - 17α - methyl-5α-androstan-17β-ol.
4. 3-(m - dimethylaminobenzoyloxy)imino - 17α-methyl-5α-androstan-17β-ol.
5. 3-(p - chlorobenzoyloxy)imino - 17α - methyl - 5α-androstan-17β-ol.
6. 3-(p-methoxybenzoyloxy)imino - 17α - methyl - 5α-androstan-17β-ol.
7. A compound of the formula

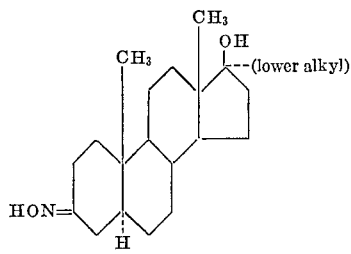

8. 3-hydroxyimino-17α-methyl-5α-androstan-17β-ol.
9. 17α-ethyl-3-hydroxyimino-5α-androstan-17β-ol.
10. A compound of the formula

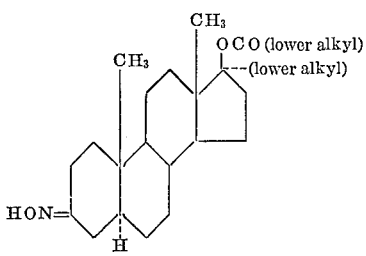

11. 3-hydroxyimino - 17α - methyl-5α-androstan-17β-ol 17-acetate.

12. A compound of the formula

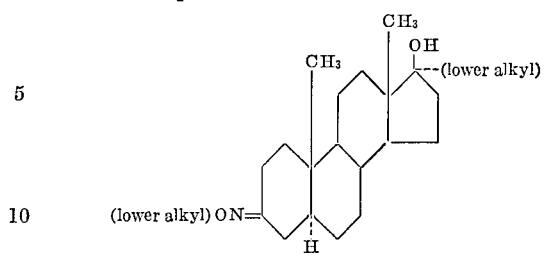

13. 3-methoxyimino-17α-methyl-5α-androstan-17β-ol.
14. 3-(tertiary-butoxy)imino-17α-methyl-5α-androstan-17β-ol.
15. A compound of the formula

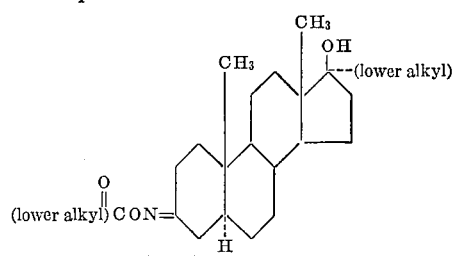

16. 3-acetoxyimino-17α-methyl-5α-androstan-17β-ol.
17. A compound of the formula

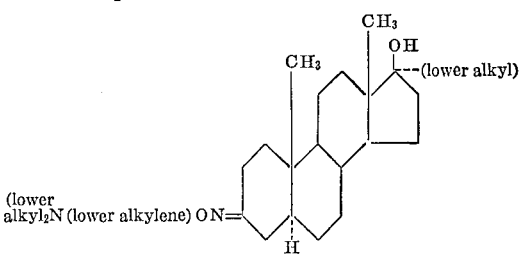

18. 3-(2 - diethylaminoethoxy)imino - 17α - methyl-5α-androstan-17β-ol.
19. A compound of the formula

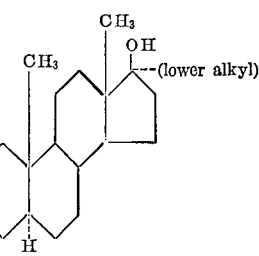

20. 3-carboxymethoxyimino-17α-methyl-5α-androstan-17β-ol.

References Cited by the Examiner

Fieser et al.: Steroids, pages 692–96 (1959), Reinhold Pub. Co., New York.
Schmitt et al.: Bull. Soc. Chim. France, pages 1855–63 (1963).

LEWIS GOTTS, *Primary Examiner.*

UNITED STATES PATENT OFFICE
CERTIFICATE OF CORRECTION

Patent No. 3,211,756                          October 12, 1965

Robert H. Mazur

It is hereby certified that error appears in the above numbered patıt requiring correction and that the said Letters Patent should read as ɔrrected below.

Column 8, lines 58 to 67, the lower left-hand portion of the formula should appear as shown below instead of as in the patent:

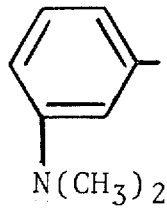

column 12, lines 17 to 26, the lower left-hand portion of the formula should appear as shown below instead of as in the patent:

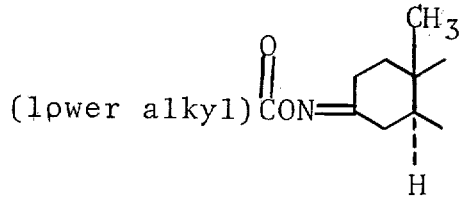

same column 12, lines 30 to 48, the lower left-hand portion of the formula should appear as shown below instead of as in the patent:

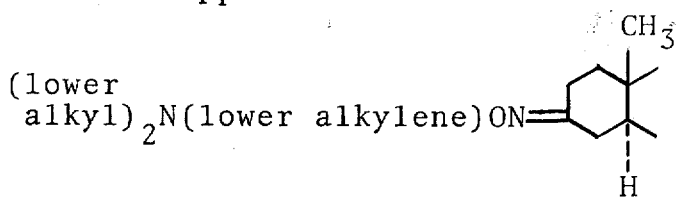

Signed and sealed this 26th day of July 1966.

(SEAL)
Attest:

ERNEST W. SWIDER                                EDWARD J. BRENNER
Attesting Officer                               Commissioner of Patents